(12) United States Patent
Hendrix

(10) Patent No.: US 6,355,179 B1
(45) Date of Patent: Mar. 12, 2002

(54) DECOMPOSITION OF RESIDUAL HYDROXYLAMINE BY HYDROGEN PEROXIDE TREATMENT

(75) Inventor: David C. Hendrix, Lake Jackson, TX (US)

(73) Assignee: BASF Corporation, Mount Olive, NJ (US)

( * ) Notice: Subject to any disclaimer, the term of this patent is extended or adjusted under 35 U.S.C. 154(b) by 0 days.

(21) Appl. No.: 09/457,725

(22) Filed: Dec. 10, 1999

(51) Int. Cl.$^7$ .................................................. C02F 1/72
(52) U.S. Cl. ........................ 210/759; 210/766; 210/903
(58) Field of Search ................................ 210/758, 759, 210/766, 903

(56) References Cited

U.S. PATENT DOCUMENTS

| | | | |
|---|---|---|---|
| 4,147,623 A | | 4/1979 | Koff et al. |
| 4,725,360 A | | 2/1988 | Fuchs et al. |
| 4,927,542 A | | 5/1990 | Fuchs et al. ................. 210/711 |
| 5,062,966 A | * | 11/1991 | Dotson et al. |
| 5,227,146 A | | 7/1993 | Heitner |
| 5,788,946 A | | 8/1998 | Riddle et al. |
| 5,837,107 A | | 11/1998 | Watzenberger et al. |
| 5,885,412 A | | 3/1999 | Päärt et al. |
| 6,190,567 B1 | * | 2/2001 | Leutner et al. |

FOREIGN PATENT DOCUMENTS

| | | | |
|---|---|---|---|
| DE | 198 26 019 | 12/1998 | ............. C02F/1/72 |
| EP | 0 963 953 | 12/1999 | ............. C02F/1/72 |
| JP | 53-7309 | 4/1977 | |
| JP | 27616 | 3/1978 | |
| JP | 50-122899 | 3/1978 | |
| JP | 62-56798 | 11/1981 | |
| JP | 52-11272 | 7/1984 | |
| JP | 55-143868 | 4/1987 | |
| JP | 55-144797 | 11/1987 | |

OTHER PUBLICATIONS

Abstract; Freeport Research Library; E31–H05 E35–X M11–A06 M11–B05 M11–B05.
Abstract; Freeport Research Library; prt max indented include ab 1–24 ss 1; –1–(WPAT).

* cited by examiner

Primary Examiner—Betsey Morrison Hoey
(74) Attorney, Agent, or Firm—Nixon & Vanderhye P.C.

(57) ABSTRACT

Decomposition of excess hydroxylamine is accomplished by bringing a hydroxylamine-containing wastewater stream into contact with hydrogen peroxide. Most preferably, the wastewater stream is at neutral pH (e.g., pH between 7–8) and at elevated temperature (e.g., at least about 90° C.) when brought into contact with hydrogen peroxide. The presence of ammonium ion ($NH^+$) accelerates the decomposition of hydroxylamine in the wastewater stream.

28 Claims, No Drawings

DECOMPOSITION OF RESIDUAL HYDROXYLAMINE BY HYDROGEN PEROXIDE TREATMENT

FIELD OF THE INVENTION

The present invention relates generally to the treatment of process waste streams. In preferred embodiments, the present invention relates to the treatment of process wastewater streams containing hydroxylamine with hydrogen peroxide so as to decompose the hydroxylamine in the stream and thereby render it suitable for biological wastewater treatment.

BACKGROUND AND SUMMARY OF THE INVENTION

Excess hydroxylamine ($NH_2OH$) in process waste water streams can potentially be toxic to the biological mechanisms responsible for adequate wastewater treatment. Therefore, excess hydroxylamine must be decomposed prior to biological wastewater treatment.

According to the present invention, decomposition of excess hydroxylamine is accomplished by bringing the hydroxylamine-containing wastewater stream into contact with hydrogen peroxide. Most preferably, the wastewater stream is at neutral pH (e.g., pH between 7–8) and at elevated temperature (e.g., at least about 90° C.) when brought into contact with hydrogen peroxide. In another aspect of this invention, the presence of ammonium ion ($NH^+$) accelerates the decomposition of hydroxylamine in the wastewater stream.

These and other aspects and advantages of the present invention will become more clear after careful consideration is given to the following detailed description of the preferred exemplary embodiments thereof.

DETAILED DESCRIPTION OF THE INVENTION

The present invention necessarily depends upon a wastewater stream containing residual amounts of hydroxylamine. It is especially useful in the treatment of wastewater streams that contain greater than about 2.5 mg hydroxylamine per liter since such excess amounts of hydroxylamine are known to be potentially toxic to the biological mechanism responsible for adequate wastewater treatment. However, the present invention may also be usefully employed to treat wastewater streams with residual hydroxylamine content less than about 2.5 mg/liter. The present invention has been found to be especially effective in the treatment of wastewater streams containing greater than about 100 mg hydroxylamine per liter, particularly between about 800 to about 1100 mg hydroxylamine/liter.

Residual amounts of free-base hydroxylamine ($NH_2OH$) in water are readily decomposed by treatment with hydrogen peroxide ($H_2O_2$). The time required for decomposition ranges from 0.5 hour to in excess of 24 hours. Decomposition is either partial or complete depending on the reaction conditions. In this regard, higher temperature (e.g., about 90° C. or greater) results in a higher rate of decomposition compared to lower temperature (e.g., about 60° C. or greater). Neutral pH (e.g., between about 7–8) results in a significantly higher rate of decomposition compared to alkaline pH (e.g., between about 10–12).

The molar ratio of hydrogen peroxide to hydroxylamine will be greater than about 55%, and more preferably greater than about 68%. Thus, for example, a molar ratio of 58% hydrogen peroxide is sufficient to cause approximately 77% decomposition of the hydroxylamine, while a molar ratio 69% $H_2O_2$:$NH_2OH$ is sufficient to cause 97% decomposition of the hydroxylamine. In accordance with the present invention, therefore, the hydroxylamine present in the process stream will be decomposed in a substantial amount of greater than about 75%, and more preferably in an amount greater than about 95%.

The presence of ammonium ion ($NH^+$) increases the rate of decomposition. Specifically, ammonium ion is preferably present in an amount between about 300 to about 500 mg/L, and more preferably between about 400 to about 450 mg/L, at 90° C.

The present invention will be further understood from the following non-limiting Examples.

EXAMPLES

Example I

In the tests described below, 200 ml test solutions containing 6 wt. % sodium sulfate, in addition to other reagents were heated to the appropriate temperature in a water bath and the reagents were added. Hydroxylamine as a 50% free-base aqueous solution was added as the penultimate constituent, and hydrogen peroxide as either a 5% or 15% aqueous solution was added last. The solution was stirred briefly, covered with a watchglass, and maintained at temperature for the duration of the test. Some tests were marked by evolution of a gas as fine bubbles; otherwise the course of the tests was uneventful. Volumetric samples were removed periodically and after suitable dilution were analyzed for hydroxylamine content.

The first test was done to determine the spontaneous decomposition of hydroxylamine. This test consisted of 1000 mg hydroxylamine/liter (30.3 milliMolar), 0.62% ammonium sulfate (94 milliEquivalents/liter), 0.40% sodium hydroxide (100 mEq/liter), and 5.2 % sodium sulfate. The temperature was 60° C. The results of this test showed that hydroxylamine is relatively stable under alkaline conditions.

The second test was done to determine the rate of decomposition of hydroxylamine in the presence of Ferric sulfate. This test was done with addition of 330 mg ferric sulfate tetrahydrate/1 (75 mg $Fe^{3+}$/liter; 1.4 mM $Fe^{3+}$), and 495 mg hydrogen peroxide/liter (14.5 mM). Other reagents were the same, but the hydroxylamine concentration was slightly less than in the first test (892 mg/liter; 27 mM). An immediate precipitate formed following addition of the ferric sulfate solution to the reaction mixture. Hydroxylamine concentration decreased to 451 mg/liter at 2 hours and 379 mg/liter at 4 hours. A residue of 97 mg/liter remained after 22 hours. The results of hydroxylamine decomposition agree approximately with the previous decomposition test done in the presence of ferric ion.

Example II

Further testing was done to determine the effects of pH on hydroxylamine decomposition rate. All tests were done at 60° C.

The initial pH for these tests was controlled primarily by addition of ammonia either as an aqueous free-base solution or as the sulfate salt. Additional control was done through addition of small amounts of sodium hydroxide or sulfuric acid. Due to the nature of the test procedure, and the elevated temperature, it was not always possible to obtain precise pH measurements. Therefore, some pH values are reported as ranges. pH measurements used to determine changes in pH value were done on cooled and diluted (1→50) solutions.

Decomposition was significantly faster at neutral pH compared to alkaline pH. This is shown in a series of tests, the results of which are tabulated below in Table A. For example, in test #1, at an initial pH of 11.8, the hydroxylamine concentration decreased from 992 to 685 mg/l (30% decomposed) after 120 minutes, but in test #2, at an initial pH in the range of 7–8, the concentration decreased from 1025 to 69 mg hydroxylamine/l (93% decomposed) in just 30 minutes. The initial ammonia concentrations were 2060 mg $NH_3$/liter (120 mM) for test #1 and 4120 mg $NH_3$/liter (240 mM) for test #2.

A second series of tests (test #'s 3–5) was done with initial ammonia concentrations of 440 mg $NH_3$/liter (26 mM). All of these tests were done at approximately neutral pH. The rate of decomposition was fastest at an initial pH of 7.3 (test #4), when a 44% decrease in hydroxylamine concentration was observed in the first 30 minutes (941 to 526 mg/liter). Decomposition was slower at an initial pH of 6.5, with a 32% decrease in the first 30 minutes (855 to 584 mg/liter), and was significantly slower at an initial pH of 8.25, with a 14.5% decrease in the first 30 minutes (997 to 861 mg/liter).

pH appears to decrease during the course of the decomposition. The decrease was most pronounced at an initial pH of 6.5 (test #5, approximate change of 2 pH units), and was minimal at an initial pH of 8.25 (test #3, no change observed). At high pH, approximately 100 mg nitrite ion/liter is formed in the course of decomposition. No nitrite was observed at neutral pH.

TABLE A

Effect of pH on Hydroxylamine Decomposition

| Test # | temp. °C. | initial pH | Ammonia mg/L | Hydroxylamine mg/L | | |
|---|---|---|---|---|---|---|
| | | | | start | 30 min | 120 min |
| 1 | 60 | 11.8 | 2060 | 992 | 861 | 685 |
| 2 | 60 | 7–8 | 4120 | 1025 | 69 | 0 |
| 3 | 60 | 8.25 | 440 | 997 | 885 | 745 |
| 4 | 60 | 7.3 | 440 | 941 | 526 | 205 |
| 5 | 60 | 6.5 | 440 | 855 | 584 | 316 |

Example III

Further testing was done to determine the effects of ammonia ion on hydroxylamine decomposition rate. Because of the neutral pH of these solutions, ammonia is present as the ammonium ion.

Several tests indicated that the rate of hydroxylamine decomposition is affected by the concentration of ammonium ion. This is shown in the results of two sets of tests, which are given in Table B. The first set of tests (tests #6 and #7) were done at 60° C. In test #6, the concentration of ammonia was 4120 mg $NH_3$/liter (240 mM). Hydroxylamine concentration decreased by 93% in the first 30 minutes. In test #7, the concentration of ammonia was 440 mg $NH_3$ /liter (26 mM). Hydroxylamine concentration decreased by 44% in the first 30 minutes.

The second set of tests were done at 90° C. In test #8, the concentration of ammonia was 410 mg $NH_3$/liter (24 mM). The decomposition of hydroxylamine was extremely rapid. The concentration decreased from 985 to 223 mg hydroxylamine/liter in only 5 minutes (77% decomposed). In test #9, the concentration of ammonia was zero. The concentration decreased from 1005 to 893 mg hydroxylamine/liter in 5 minutes (15% decomposed), and after 30 minutes decreased to 671 mg hydroxylamine/liter (36% decomposed).

TABLE B

Effect of Ammonia on Hydroxylamine Decomposition

| Test # | temp. °C. | initial pH | Ammonia mg/L | Hydroxylamine mg/L | | |
|---|---|---|---|---|---|---|
| | | | | start | 30 min | 120 min |
| 6 | 60 | 7–8 | 4120 | 1025 | 69 | 0 |
| 7 | 60 | 7–8 | 440 | 941 | 526 | 205 |
| 8 | 90 | apr. 7 | 410 | 985 | 38 | 38 |
| 9 | 90 | apr. 7 | 0 | 1005 | 671 | 92 |

Example IV

Further testing was done to determine the effects of temperature on hydroxylamine decomposition rate.

As shown in Table C, in test #10, conducted at 60° C., the hydroxylamine concentration decreased from 941 to 526 mg/liter (44% decomposed) in 30 minutes. In test #11, conducted at 90° C., the hydroxylamine concentration decreased from 985 to 223 mg/liter (77% decomposed) in only 5 minutes, and to 38 mg/liter in 30 minutes. Initial concentrations of ammonia and pH were similar for these two tests.

TABLE C

Effect of Temperature on Hydroxylamine Decomposition

| Test # | temp. deg. C. | initial pH | Ammonia mg/L | Hydroxylamine mg/L | | |
|---|---|---|---|---|---|---|
| | | | | start | 30 min | 120 min |
| 10 | 60 | 7–8 | 440 | 941 | 526 | 205 |
| 11 | 90 | apx 7 | 410 | 985 | 38 | 38 |

Example IV

Further testing was done to determine the effects of the initial hydrogen peroxide concentration on the hydroxylamine decomposition rate.

In test #12, an initial concentration of 15.4 mM hydrogen peroxide reacted with an initial concentration of 866 mg hydroxylamine/liter (26.6 mM—molar ratio of 0.58:1.00). The concentration of hydroxylamine decreased to 316 mg/liter after 10 minutes (64% decomposed); however, a residual concentration of approximately 200 mg/liter remained after the reaction was complete (77% decomposed). In test #14, an initial concentration of 20.5 mM hydrogen peroxide reacted with an initial concentration of 985 mg hydroxylamine/l (29.8 mM—molar ratio of 0.69:1.00). The concentration of hydroxylamine decreased to 96 mg/liter after 10 minutes (90% decomposed), with a residual concentration of 3.8 mg/liter.

Finally, in test #13, an initial concentration of 30.7 mM hydrogen peroxide reacted with an initial concentration of 801 mg hydroxylamine/liter (24.3 mM—molar ratio 1.26:1.00). In this test, the decomposition of hydroxylamine was slower. The concentration decreased to 168 mg/liter after 10 minutes (79% decomposed). No residual hydroxylamine was detected after 30 minutes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for the substantial decomposition of hydroxylamine in a hydoxylamine-containing process stream comprising bringing the hydroxylamine-containing process stream into contact with hydrogen peroxide in an amount, and under temperature and pH conditions, sufficient to decompose substantially the hydroxylamine present in the process stream.

2. The process of claim 1, wherein the process stream is brought into contact with hydrogen peroxide in the presence of an amount of ammonium ions sufficient to increase the rate of hydroxylamine decomposition.

3. The process of claim 1, where the temperature condition is at least about 90° C. or greater.

4. The process of claim 1 or 3, wherein the pH condition is between about 7–8.

5. The process of claim 1, wherein hydrogen peroxide is present in a molar ratio of hydrogen peroxide to hydroxylamine of greater than about 55%.

6. The process of claim 5, wherein the molar ratio of hydrogen peroxide to hydroxylamine is greater than about 68%.

7. The process of claim 1, wherein the process stream contains greater than about 100 mg/liter of hydroxylamine.

8. The process of claim 1, wherein the hydroxylamine is present in the process stream in an amount greater than about 800 mg/liter.

9. The process of claim 1, wherein the hydroxylamine is present in the process stream in an amount between about 800 to about 1100 mg/liter.

10. A process for treating a hydroxylamine-containing process stream so as to decompose substantially hydroxylamine contained therein, comprising bringing the hydroxylamine-containing process stream into contact with hydrogen peroxide and ammonium ions under conditions and for a time sufficient to decompose substantially the hydroxylamine in the process stream.

11. The process of claim 10, wherein the ammonium ions are present in an amount between about 300 to about 500 mg/L at 90° C.

12. The process of claim 11, wherein the ammonium ions are present in an amount between about 400 to about 450 mg/L at 90° C.

13. The process of claim 10, wherein the hydroxylamine-containing process stream is brought into contact with the hydrogen peroxide and ammonium ions at a temperature condition of at least about 90° C. or greater.

14. The process of claim 10 or 13, wherein the hydroxylamine-containing process stream is brought into contact with the hydrogen peroxide and ammonium ions at a pH condition of between about 7–8.

15. The process of claim 10, wherein the hydrogen peroxide is present in a molar ratio of hydrogen peroxide to hydroxylamine of greater than about 55%.

16. The process of claim 15, wherein the molar ratio of hydrogen peroxide to hydroxylamine is greater than about 68%.

17. The process of claim 10, wherein the process stream contains greater than about 2.5 mg/liter of hydroxylamine.

18. The process of claim 10, wherein the hydroxylamine is present in the process stream in an amount greater than about 800 mg/liter.

19. The process of claim 10, wherein the hydroxylamine is present in the process stream in an amount between about 800 to about 1100 mg/liter.

20. A process for substantially decomposing residual free-base hydroxylamine in a process stream containing free-base hydoxylamine in water comprising bringing the process stream into contact with hydrogen peroxide in an amount, and under temperature and pH conditions, sufficient to decompose substantially the free-base hydroxylamine present in the process stream.

21. The process of claim 20, wherein the process stream is brought into contact with hydrogen peroxide in the presence of an amount of ammonium ions sufficient to increase the rate of hydroxylamine decomposition.

22. The process of claim 20, where the temperature condition is at least about 90° C. or greater.

23. The process of claim 20 or 22, wherein the pH condition is between about 7–8.

24. The process of claim 20, wherein hydrogen peroxide is present in a molar ratio of hydrogen peroxide to hydroxylamine of greater than about 55%.

25. The process of claim 24, wherein the molar ratio of hydrogen peroxide to hydroxylamine is greater than about 68%.

26. The process of claim 20, wherein the process stream contains greater than about 100 mg/liter of hydroxylamine.

27. The process of claim 20, wherein the hydroxylamine is present in the process stream in an amount greater than about 800 mg/liter.

28. The process of claim 20, wherein the hydroxylamine is present in the process stream in an amount between about 800 to about 1100 mg/liter.

* * * * *